United States Patent Office 3,346,597
Patented Oct. 10, 1967

3,346,597
HALOGEN-CONTAINING CYCLIC ANHYDRIDES
William De Acetis, Berkeley, Calif., assignor to Shell Oil Company, New York, N.Y., a corporation of Delaware
No Drawing. Filed Mar. 30, 1964, Ser. No. 355,923
6 Claims. (Cl. 260—346.3)

ABSTRACT OF THE DISCLOSURE

Novel vic-halo-trihalomethyl cyclic anhydrides, useful as curing agents for epoxy resins, are prepared by reaction of an unsaturated cyclic anhydride with trihalomethanesulfonyl halide.

This invention relates to a novel class of organic compounds and to the method by which such compounds are produced. More particularly it relates to certain novel cyclic carboxylic acid anhydrides containing a high percentage of halogen within the molecule.

The addition of tetrahalomethanes, particularly carbon tetrachloride, to certain types of ethylenically unsaturated molecules is well known in the art, see, for example, Walling, "Free Radicals in Solution," John Wiley and Sons, New York, 1957, particularly chapter 6 and references therein. Carbon tetrachloride and certain related tetrahalomethanes have been shown to add to the ethylenic linkage of many unsaturated molecules under a variety of free radical conditions. Although the addition of carbon tetrachloride to acyclic olefins, particularly acyclic olefins wherein the ethylenic linkage is terminal, gives an addition product in good yield, greater difficulty is attendant to the addition of carbon tetrachloride to cyclic olefins wherein the unsaturated linkage is a portion of the ring. Israelashveli et al., J. Chem. Soc., 3261 (1951) discuss extensively the free radical addition of carbon tetrachloride to cyclohexene. While the expected 1-chloro-2-trichloromethylcyclohexane addition product was obtained, this product was observed only in low yield, and a considerable portion of the reaction involved abstraction of allylic hydrogens from the cyclohexene ring. Thus, the addition of carbon tetrahalides to cyclic olefins does not appear to be as facile as are additions to acyclic systems. It would be of advantage to provide a method for the addition of the elements of carbon tetrahalides to cyclic systems, which method gives better results when cyclic unsaturates are employed.

It is an object of the present invention to provide a process for the addition of the elements of carbon tetrahalides to certain cyclic olefins and the novel compounds produced thereby. A more particular object is to provide a process for the addition of the elements of certain carbon tetrahalides to cyclic, ethylenically unsaturated carboxylic acid anhydrides and the vic-halo-trihalomethyl substituted cyclic anhydrides thereby produced.

It has now been found that these objects are accomplished by the reaction of trihalomethanesulfonyl halide with cyclic, ethylenically unsaturated carboxylic acid anhydride. In the process of the invention, the sulfonyl halide reactant eliminates sulfur dioxide and the moieties added to the olefin are the elements of carbon tetrahalide.

The sulfonyl halide reactant is a methanesulfonyl halide, all hydrogen substituents of which have been replaced by halogen. One class of such trihalomethanesulfonyl halides is represented by the formula

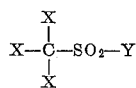

wherein X independently is halogen, e.g., fluorine, chlorine, bromine or iodine, and Y is halogen of atomic number from 17 to 35, i.e., the middle halogens chlorine and bromine. Although the trihalomethanesulfonyl middle-halides of the above-depicted formula wherein X is fluorine or iodine are satisfactorily utilized, preferred sulfonyl halides are those wherein X is also halogen having an atomic number from 17 to 35.

Illustrative of the sulfonyl halide reactants are trichloromethanesulfonyl chloride, tribromomethanesulfonyl bromide, trifluoromethanesulfonyl chloride, difluorochloromethanesulfonyl chloride, dibromoiodomethanesulfonyl bromide, triiodomethanesulfonyl chloride, dichlorobromomethanesulfonyl chloride, chlorofluoroiodomethanesulfonyl bromide and the like. In general, sulfonyl chlorides are preferred over the corresponding sulfonyl bromides, and most preferred as the trihalomethanesulfonyl middle-halide reactant is trichloromethanesulfonyl chloride.

The cyclic carboxylic acid anhydride is mono- to polycyclic and contains at least one ethylenic linkage, i.e., non-aromatic carbon-carbon double bond, as a portion of the ring system. The reactants of the invention are vic-dicarboxy anhydrides, that is, the carbon atoms alpha to the carbonyl groups of the anhydride moiety are joined by a carbon-carbon bond, and the alpha carbon atoms together with the atoms of the carbonyloxycarbonyl linkage, i.e., the anhydride moiety, form a five-membered ring. The remaining valences of the alpha carbon atoms are satisfied by hydrogen substituents, or alternatively divalent aliphatic hydrocarbon substituents which form from 1 to 3 additional rings. Preferred cyclic anhydrides are hydrocarbon anhydrides, have from 1 to 4 rings, including the ring formed by the anhydride moiety and the carbon atoms alpha thereto, from 4 to 14 carbon atoms, and contain a single ethylenic linkage as the sole carbon-carbon unsaturation.

One class of such cyclic anhydrides in characterized as maleic anhydride and Diels-Alder condensation products thereof with acyclic or cyclic conjugated hydrocarbon diene containing from 4 to 10 carbon atoms, preferably from 4 to 6, and containing the conjugated ethylenic linkages as the only carbon-carbon unsaturation. Illustrative of suitable acyclic hydrocarbon dienes are butadiene, isoprene, 1,3-pentadiene, 1,3-hexadiene, 2,4-hexadiene, 3,5-octadiene and the like, while cyclic hydrocarbon dienes include cyclopentadiene, 1,3-cyclohexadiene, 1,3-cyclooctadiene, 4-methyl-1,3-cyclohexadiene, 5,5-diethylcyclopentadiene and the like. The Diels-Alder condensation of such dienes and maleic anhydride is well known. For example, from butadiene and maleic anhydride is obtained 1,2,3,6-tetrahydrophthalic anhydride.

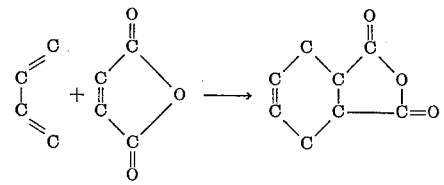

Other illustrative Diels-Alder condensation products include 4-methyl-1,2,3,6-tetrahydrophthalic anhydride prepared from maleic anhydride and isoprene, bicyclo(2.2.1)hept-5-ene-2,3-dicarboxylic acid anhydride produced from maleic anhydride and cyclopentadiene, and bicyclo(2.2.2)oct-5-ene-2,3-dicarboxylic acid anhydride produced from 1,3-cyclohexadiene and maleic anhydride. A particularly preferred class of cyclic anhydride reactants comprises maleic anhydride and Diels-Alder condensation products thereof represented by the formula

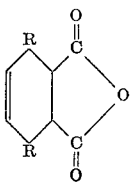

wherein R is hydrogen or alternatively both R's together form a divalent alkylene radical having from 1 to 2 carbon atoms, i.e., methylene or ethylene.

The process of the invention is conducted by mixing the sulfonyl halide and unsaturated anhydride and maintaining the mixture at a somewhat elevated temperature until reaction is complete. The method of mixing is not critical. One reactant may be added to the other, as by adding the sulfonyl halide continuously or in increments to the unsaturated anhydride, although it is equivalently useful to initially mix the entire amount of reactants. The reactants may be employed in any convenient ratio. Although molar ratios of sulfonyl halide to unsaturated anhydride from about 4:1 to about 1:4 are conveniently utilized, molar ratios from about 2:1 to about 1:2 are preferred, and good results are frequently obtained when the ratio of reactants is substantially stoichiometric, that is, a molar ratio of about 1:1.

The reaction is conducted at elevated temperatures. Suitable temperatures vary from about 50° C. to about 200° C., although temperatures from about 100° C. to about 175° C. are preferred. Reaction pressures that are atmospheric, subatmospheric or superatmospheric are satisfactory, so long as the reactants are maintained in the liquid or solid phase. Little advantage is gained by employing pressures other than atmospheric and the use of atmospheric pressure is preferred. The reaction is typically conducted in the substantial absence of reaction diluent, although diluents that are inert to the sulfonyl halide and anhydride reactants as well as the products produced therefrom, e.g., the ethers, particularly cyclic ethers such as dioxane and tetrahydrofuran, and halogenated hydrocarbons such as chloroform, carbon tetrachloride and methylene bromide, may be employed. On occasion, during the course of reaction, minor amounts of carbon tetrahalide are formed by decomposition of the sulfonyl halide reactant. Such material in effect serves as a reaction diluent, and although no great detriment arises from the presence of such diluent, it may be advantageous during the course of long reaction periods to remove any extraneous diluent as by distillation. It is preferred, however, to conduct the process of the invention under conditions that are substantially anhydrous, as the presence of moisture results in the hydrolysis of the reactants. Small amounts of moisture may be tolerated, however, if excess reactants are employed.

In the preferred modification of the process of the invention, the reaction is conducted in the substantial absence of added catalyst. Alternatively, however, catalytic quantities of conventional free radical initiators may be employed to facilitate reaction. Illustrative of free radical initiators that may be employed are the peroxides, e.g., acetyl peroxide and benzoyl peroxide, the hydroperoxides such as tert-butyl hydroperoxide and tert-amyl hydroperoxide, and azobisnitriles such as azobisisobutyronitrile. When added catalyst is employed, only catalytic amounts are required. Quantities of catalyst up to about 2% by weight of the reaction mixture are satisfactory.

Subsequent to reaction the product is separated and recovered by conventional means, e.g., fractional distillation, selective extraction, crystallization and the like.

The process of the invention results in the addition of the elements of carbon tetrahalide to the ethylenic linkage of the unsaturated anhydride. Without wishing to be bound by any particular theory, it would appear that the sulfur-halogen bond of the sulfonyl halide reactant homolytically cleaves to produce a middle-halide radical and a trihalomethanesulfonyl radical, which latter radical loses sulfur dioxide to produce the trihalomethyl radical observed as a product substituent. The reaction process is typified by the following equation illustrating reaction of trichloromethanesulfonyl chloride and 1,2,3,6-tetrahydrophthalic anhydride.

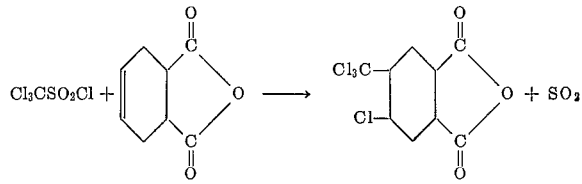

Other exemplary products of the process of the invention include 5-chloro-6-trichloromethylbicyclo(2.2.1)heptane-2,3-dicarboxylic acid anhydride, α-bromo-α'-trifluoromethylsuccinic anhydride, 5-chloro-6-tribromomethylbicyclo(2.2.1)octane-2,3-dicarboxylic acid anhydride, 4-chloro-4-methyl-5-trichloromethylhexahydrophthalic anhydride, α-bromo-α-dichloroiodo-methylsuccinic anhydride, 5-chloro-6-difluorobromomethylbicyclo(2.2.1) heptane-2,3-dicarboxylic acid anhydride, 4-chloro-6-methyl-5-trichloromethylhexahydrophthalic anhydride, α-bromo-α'-tribromomethylsuccinic anhydride, 4-chloro-5-trichloromethylbicyclo(2.2.2)octane - 2,3-dicarboxylic acid anhydride and the like.

The novel products of the invention find numerous applications as chemical intermediates. The halogen substituents may be employed as reactive sites in the formation of useful quaternary ammonium derivatives, or alternatively may react with metal carboxylates, alkoxides or phenoxides to form useful esters or ethers. The elements of hydrogen halide may be removed from the molecule to form unsaturated anhydrides suitable as monomers for polymerization or copolymerization with other reactive unsaturates. The anhydride linkage remains intact during the addition process and may be utilized in the formation of useful conventional derivatives, e.g., polyesters and polyamides. The halogen-containing anhydrides are additionally useful as biocides, particularly herbicides. Of particular importance as a utility for the novel products of the invention is the use as curing agents for epoxy resins. It is of considerable present interest to provide methods for introducing high percentages of halogen into the cured product to impart fire resistance thereto. Although there are numerous examples of halogen-containing epoxy compounds, the number of epoxy curing agents containing high percentages of halogen is limited. The adduct of maleic anhydride and the elements of carbon tetrabromide, for example, contains approximately 77% by weight halogen, and when employed as a curing agent for epoxy compounds, imparts high percentages of halogen to the cured product, in many cases as high as 35% or higher.

To illustrate the novel process of the invention and the novel products obtained thereby, the following examples are provided. It should be understood that they are not to be regarded as limitations, as the teachings thereof may be varied as will be understood by one skilled in this art.

*Example 1*

To a dry 200 ml. flask was charged 50 g. of trichloromethanesulfonyl chloride and 22.5 g. of maleic anhydride. The reactants were mixed and maintained under anhydrous conditions. The reaction mixture was heated under reflux at 130° C. for 35 hours and then distilled from the flask under vacuum (0.5 mm.) and the distillate was collected in a receiver as a solid. A total of 33 g. of the α-chloro-α'-trichloromethylsuccinic anhydride, a crystalline solid which readily sublimes on heating, was obtained which represented a quantitative yield based upon a conversion of 56.5%. The product, when purified by sublimation, was colorless.

*Analysis.*—Calc.: Cl, 55.7% wt. Found: Cl, 53.4% wt.

Similar results are obtained when tribromomethanesulfonyl chloride is employed.

Example II

To a dry flask was charged 87.2 g. of trichloromethanesulfonyl chloride and 30.4 g. of tetrahydrophthalic anhydride. To the flask was added 0.25 g. of azobisisobutyronitrile and the mixture of solids was melted and heated under reflux at 90° C. for 14 hours. At this time, 7.5 ml. of carbon tetrachloride were removed by distillation, and the residue was heated for an additional 4 hours. The reaction mixture was distilled under reduced pressure (0.5 mm.) to afford two fractions, the higher boiling of which was 18 g. of 4-chloro-5-trichloromethylhexahydrophthalic anhydride, a low-melting hygroscopic solid, which crystallized in the receiver when cooled. This represented a yield of 29.4%, based upon reactants charged.

*Analysis.*—Calc.: Cl. 46.4% wt.; S, 0.00% wt. Found: Cl, 44.1% wt.; S, 0.01% wt.

Example III

When the procedure of Example I is followed to react trifluoromethanesulfonyl bromide with bicyclo(2.2.2)oct-5-ene-2,3-dicarboxylic acid anhydride, a good yield of 5-bromo-6-trifluoromethylbicyclo(2.2.2)octane-2,3-dicarboxylic acid anhydride is obtained.

Similar results are obtained when dichloroiodomethanesulfonyl chloride reacts with maleic anhydride to produce α-chloro-α'-dichloroiodomethylsuccinic anhydride.

I claim as my invention:

1. The compound

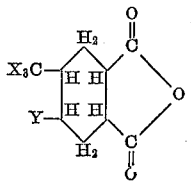

wherein X and Y independently are halogen having an atomic number from 17 to 35.

2. 4-chloro-4-trichloromethylhexahydrophthalic anhydride.

3. The compound selected from the group consisting of

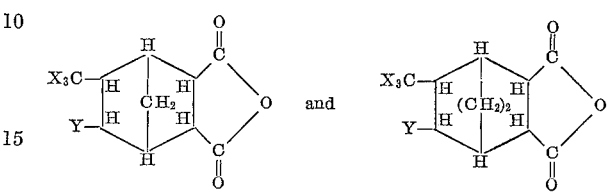

wherein X and Y independently are halogen having an atomic number from 17 to 35.

4. 5-chloro-6-trichloromethylbicyclo(2.2.1)heptane-2,3-dicarboxylic acid anhydride.

5. 5-bromo-6-tribromomethylbicyclo(2.2.1)heptane-2,3-dicarboxylic acid anhydride.

6. 5-chloro-6-trichloromethylbicyclo(2.2.2)octane-2,3-dicarboxylic acid anhydride.

References Cited

UNITED STATES PATENTS

| | | | |
|---|---|---|---|
| 2,485,099 | 10/1949 | Kharasch | 260—485 |
| 2,606,213 | 8/1952 | Ladd et al. | 260—651 |

FOREIGN PATENTS

| | | |
|---|---|---|
| 649,555 | 1/1951 | Great Britain. |

ALTON D. ROLLINS, *Primary Examiner.*

B. DENTZ, *Assistant Examiner.*